Patented Dec. 9, 1930

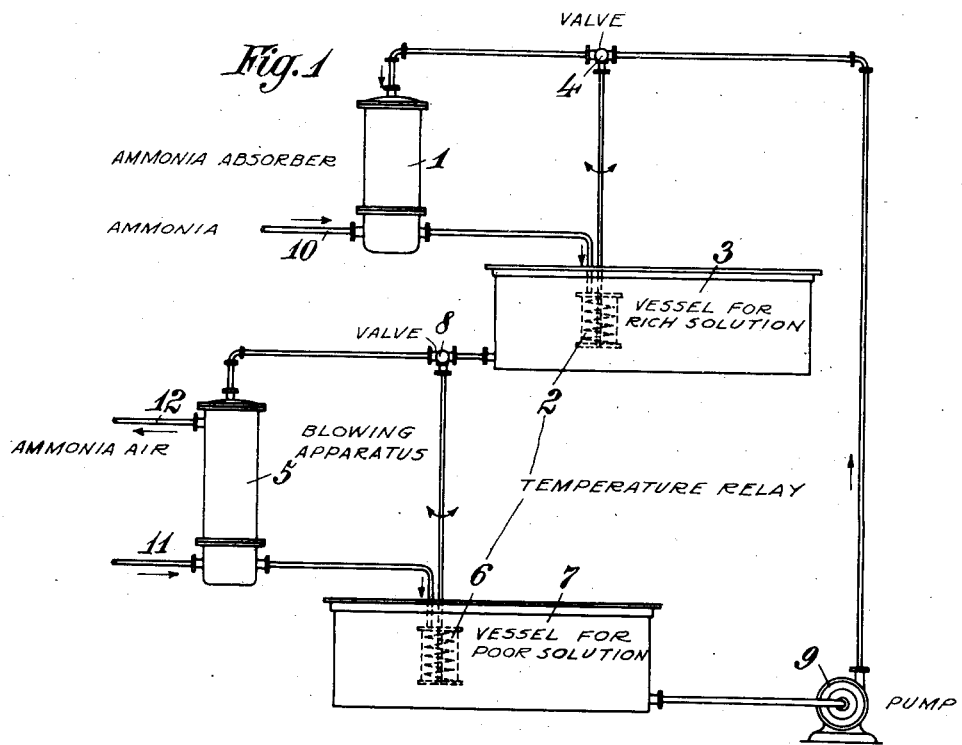
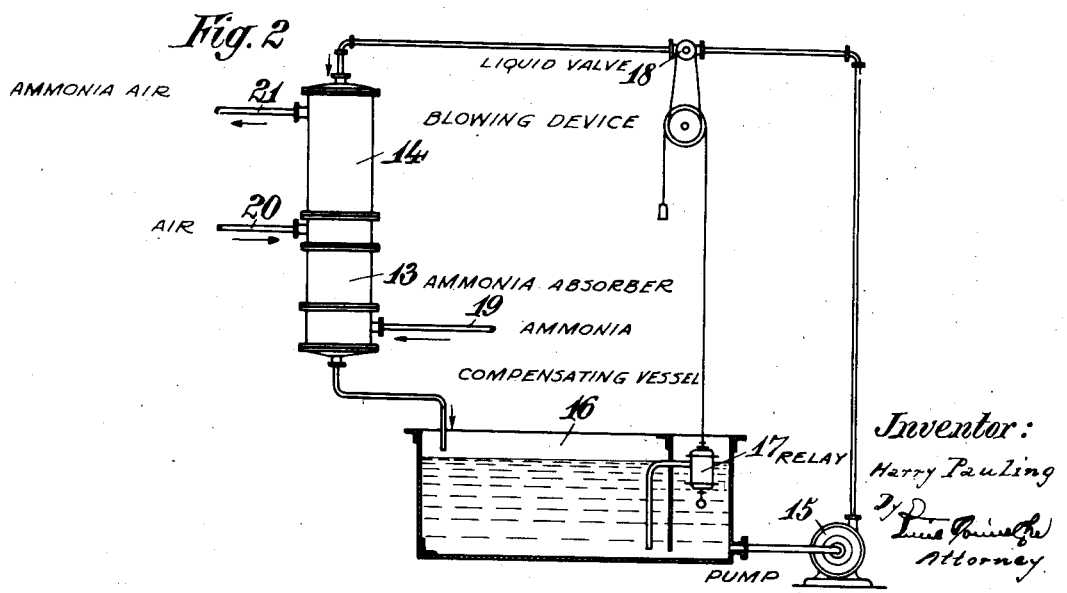

1,784,074

UNITED STATES PATENT OFFICE

HARRY PAULING, OF BERLIN, GERMANY

APPARATUS FOR THE PRODUCTION OF AMMONIA-AIR MIXTURES

Application filed December 29, 1927, Serial No. 243,370, and in Germany October 15, 1926.

I have filed applications in Germany, October 15, 1926; England, October 31, 1927; France, November 7, 1927; Norway, November 12, 1927; Czechoslovakia, October 29, 1927.

This invention relates to the preparation of an ammonia-air mixture for use in the combustion of gaseous ammonia to form nitrous (nitrose) gases for conversion into nitric acid.

In such combustion it is, as is well known, important that the mixture of ammonia gas and air or oxygen should be of the most uniform composition possible because the completeness of the conversion into nitrous gases depends very materially upon the temperature of the contact body which effects the catalytic combustion of the ammonia gas. This temperature depends in turn very much upon the concentration of the ammonia gas so that the maintenance of the mixture composition at a constant value is one of the chief conditions for attaining the maximum possible yield.

Hitherto the process was carried out so that the ammonia gas coming from the point of production first passed through a gasometer the dimensions of which had to be commensurate with the quantity of ammonia gas to be treated and were for practical requirements very considerable, a disadvantage which was aggravated by the fact that water could not, as in other cases, be employed as the sealing liquid so that oil had to be used. In any case however even a gasometer is not capable of dealing with the variations occurring in the ammonia fuel to the extent which is desirable for the uniformity of combustion.

The present invention is based upon the fact that water is an excellent absorption agent for ammonia gas which, on the other hand, aqueous ammonia solutions have the property of rapidly varying their concentration, by giving up or taking up ammonia, in accordance with variations in the partial pressure of the ammonia. Since, moreover, the blowing of air through an aqueous ammonia solution results in a solution having the partial pressure of the ammonia in the gaseous phase, according to the present invention, the ammonia gas is first supplied to a predetermined quantity of water which absorbs the gas, as well known, with avidity and even instantaneously. If then the air which is to be mixed with the ammonia gas is blown through this aqueous ammonia solution, said air will take up an appropriate amount of ammonia gas therefrom, the solution being thereby deprived of ammonia so that it may be used afresh, that is in circulation, for the foregoing operations. An ammonia-air mixture is formed the composition of which depends upon the ammonia gas content of the solution and its temperature. With variations in the ammonia supply, therefore, it is only necessary, in order to obtain a uniform composition for the ammonia-air mixture, to supply an appropriately modified quantity of the ammoniacal liquid to the air current, the constant maintenance of which presents, as is well known, no difficulties of a technical nature.

To render the regulation of the liquid circulation, which naturally, may be effected simply by hand, as independent as possible from the reliability or otherwise of the operating staff, it is preferable that in the regulation of said liquid circulation use should be made of the phenomenon whereby the temperature of the resulting solution also alters with any alteration in the quantity of ammonia gas flowing into the apparatus. As the heat of solution of ammonia gas in water is very considerable, the corresponding temperature variations are sufficiently large to be utilized practically. Said temperature variations may accordingly be employed to control, through thermostats or similar known devices, the quantities of liquid flowing on the one hand to the absorption apparatus and on the other to the apparatus in which the air is blown through the solution.

Since however an aqueous ammonia solution varies its specific weight at the same time as its ammonia content this fact may also be utilized, by means of appropriate intermediate apparatus, to control the circulation of the liquid.

As, in operating according to this invention, two liquids with different ammonia contents are obtained, it is possible, by means of a simple measure, to combine the functions of extremely sensitive and exact regulation with the storage of ammonia to an extent which was inconceivable, or at least economically impossible, with gasometers on account of the excessive cost of the plant. If each of the two stages, namely the absorption and the blowing, are provided with a suitably large vessel for the rich and poor ammonia solutions respectively, then a quite material storage effect can be obtained even if the said vessels are of comparatively small dimensions.

If, for example, in view of other conditions under which the process is operated the difference between the concentration of the solution enriched by absorption and the solution impoverished by the blowing operation is only 100 kgs. per cubic metre of solution, then a storage vessel of, for instance, 30 cubic metres capacity will store 3000 kgs., or approximately 4000 cubic metres of ammonia gas, it being necessary merely that the vessel for the impoverished solution should have a corresponding capacity. When employing two such vessels the control is effected in the following manner: In the event of an excess of ammonia gas, the air quantity remaining unaltered, the flow of liquid to the absorber is automatically increased in order that the concentration and thus the temperature and specific weight of the rich solution shall not alter. Since, however, the quantity of the solution at the blowing apparatus does not alter so long as the concentration of the rich solution remains constant, less liquid flows to the storage vessel for the poor solution than is taken from it for the purpose of supplying the absorber. Consequently the quantity of liquid therein decreases and the liquid in the vessel for the rich solution increases accordingly.

The technical advance achieved by this invention is not however exhausted by the above. It is already known that not only a definite humidity content but also uniformity of the humidity content of the ammonia-air mixture are of decisive importance for the yield in the catalytic combustion of ammonia. As the said humidity content should not in itself be unnecessarily high, lest the nitric acid to be produced from the nitrous gases should be unnecessarily diluted, it is immediately clear that it is extremely difficult to fulfil the conditions with regard to the uniformity of the humidity content because the humidity content of the air varies considerably not only from day to day but even hourly.

According to this invention uniformity of the humidity content of the emerging mixture follows immediately since the maintenance of the solution temperature at a constant value is one of the main advantages of the method. It is, however, possible to adjust the degree of humidity to the optimum values by so selecting the concentration of the rich solution and, correspondingly, of the poor solution that the resulting temperatures thereof produce the desired saturation with water vapour.

It is not possible with any other method to satisfy in such a simple and complete manner all the main requirements which are placed on the composition of the mixture, this constituting a great advance on said known methods.

Two embodiments of the invention are illustrated by way of example in the accompanying drawing in which:

Fig. 1 illustrates the method and apparatus as employed when a compensating vessel is employed for both the rich and the poor solutions for the purpose of storing up large quantities of ammonia, and Fig. 2 illustrates an arrangement which operates with one compensating vessel only, the manner of operation thus differing from that illustrated in Fig. 1 in that there is only one quantity of liquid which naturally, to perform a storing action, must alter its liquid content not only in respect of quantity but also in respect of concentration.

Referring to Fig. 1 the numeral 1 indicates the ammonia absorber and 2 a temperature relay device which controls a liquid-regulating valve 4 in any suitable manner. 3 indicates the vessel for the rich solution, 5 the blowing apparatus, 6 a temperature relay device for the liquid-regulating valve 8, 7 the vessel for the poor solution and 9 a circulating pump.

In normal operation of the arrangement liquid is taken, when the pump 9 is in operation, from the vessel 7 and delivered to the absorber 1 in which it flows therethrough and absorbs the gaseous ammonia entering at 10, after which it flows into the vessel 3 through the temperature relay device 2. Said relay 2 is, similarly to any other thermostat, so arranged that on the normal temperature being exceeded the valve 4 opens further so that more liquid can flow in, whereupon the temperature sinks. Should the temperature fall the operation takes place in the opposite manner. From the vessel 3 the rich solution flows to the blowing apparatus 5 in which air entering at 11 absorbs gaseous ammonia and water vapour to an extent depending upon the temperature and saturation. The solution deprived simultaneously of ammonia by this action flows through the temperature relay 6 which in turn controls the regulating valve 8 as already described above, into the vessel 7 after which it is returned into circulation by the pump 9. It is immediately obvious that the quantities of water flowing through the absorber 1 and the blowing device 5 must be equal so long as the quantity of ammonia entering at 10 corresponds to the quantity of ammonia contained in the gas emerging at 12. In this case the valves 4 and 8 do not need to be operated. In the event however of, for example, an excess of ammonia above the normal value entering at 10 the temperature of the liquid flowing through the temperature relay 2 would, due to increased ammonia absorption, be materially increased. Since, however, the relay 2 is very sensitive it immediately actuates the valve 4 in such a manner that so much more liquid flows in as corresponds to the excess of ammonia. The quantity of liquid flowing through the valve 8 is nevertheless not influenced by this operation. The position of the said valve consequently does not alter and more liquid flows to the vessel 3 than is removed from the same, that is rich liquid is stored in the vessel 3 while the liquid level in the vessel 7 for poor solution sinks correspondingly, more liquid being taken therefrom than is supplied thereto. If on the other hand too little ammonia is supplied, then the temperature in the absorber 1 will fall so that the temperature relay 2 will decrease the quantity of liquid flowing to the absorber 1 accordingly by throttling the valve 4. Since, however, even in this case the quantity of liquid which passes through the valve 8 should not have varied, less liquid flows to the vessel 3 than is removed therefrom. Consequently the store of liquid therein decreases while the quantity of liquid in the vessel 7 increases in proportion. The temperature relay 6 controlling the valve 8 is, in view of what has been said above, not really necessary. It is nevertheless very useful since the air, although entering in a constant quantity, certainly does not do so at a perfectly uniform temperature and uniform water vapour content whereby, naturally, alterations are caused in the temperature of the liquid flowing from 5, which alterations are compensated for by the relay 6 associated with the controlling valve 8.

Referring now to Fig. 2 of the drawing the numeral 13 indicates the ammonia absorber, 14 the immediately adjacent blowing device, 15 a circulation pump, 16 a compensating vessel, 17 a relay responding to variations in the specific gravity, 18 a liquid valve controlled by said relay, 19 the inlet for the ammonia, 20 the inlet for the air and 21 the outlet for the ammonia air mixture.

In operation the solution flows with a predetermined ammonia content first of all through the blowing device 14 whereby the solution is suitably deprived of ammonia and is correspondingly cooled by evaporation. In the vessel 13 the said solution on the other hand again takes up ammonia directly, so that it flows into the vessel 16 at the same temperature which it had on flowing into the blowing device 14. This is true naturally only so long as the normal quantity of ammonia is supplied. In the event of excess of ammonia the solution emerges from the absorber 13 stronger than it was previously in the vessel 16 because it has taken up more ammonia. Since, however, a more concentrated ammonia solution is specifically lighter than a weaker solution the relay 17 must act in such a manner that it throttles the liquid circulation by means of the valve 18 because a richer solution is then flowing into the blowing device 14. With this arrangement it is naturally necessary for the liquid in the vessel 16 to be satisfactorily intermingled in order that the variations in specific gravity shall take place rapidly, for, naturally, the specific gravity of the solution emerging at 13 can in this case not be a determining factor for the actuation of the relay but only that of the solution emerging at 14. With this manner of operating the openings 19 and 20 may be combined; the opening 20 may also be located below 19 whereby a combination of absorber and of blowing device would be arranged. Finally it is possible, as also illustrated in Fig. 1, to arrange the absorber 13 above the blowing device 14 without there being any fundamental alteration in the manner of operation. It must merely be remembered that on storing up excess ammonia not only will the ammonia content of the circulating solution increase but also the temperature of the solution. As a result working is within narrower limits than in the case illustrated in Fig. 1 so that the latter manner of operation is preferable for very large variations.

In order to use as small quantities of circulating liquid as possible it is to be recommended that not only the absorber but also, more particularly, the blowing device should be constructed as counter-current apparatus, especially because in this manner the uniformity of temperature is ensured with greater safety and reliability than without counter-current action. The embodiments given by way of example naturally do not exhaust the scope of the invention since other constructional forms are possible depending upon local conditions.

Having now particularly described and ascertained the nature of my said invention and in what manner the same is to be performed, I declare that what I claim is:—

A system for producing a uniform ammonia-air mixture comprising a liquid circulating system; an ammonia absorber in said system; means for forcing an air current into the ammonia solution; and control members for automatically controlling the circulation of the liquid and operated by means of variations in the specific gravity of the solution.

In testimony whereof I have affixed my signature.

Dr. HARRY PAULING.